United States Patent [19]

Smutny

[11] Patent Number: 4,960,807
[45] Date of Patent: Oct. 2, 1990

[54] STABILIZED CARBON MONOXIDE OLEFIN COPOLYMER COMPOSITIONS

[75] Inventor: Edgar J. Smutny, Houston, Tex.

[73] Assignee: Shell Oil Company, Houston, Tex.

[21] Appl. No.: 351,367

[22] Filed: May 15, 1989

[51] Int. Cl.$^5$ ................................................ C08K 5/52
[52] U.S. Cl. ................................ 524/147; 524/419; 524/420; 524/432
[58] Field of Search ............. 524/432, 419, 420, 147; 528/392

[56] References Cited

U.S. PATENT DOCUMENTS

| | | | |
|---|---|---|---|
| 2,860,115 | 11/1958 | Hecker et al. | 524/147 |
| 3,188,298 | 6/1965 | Williamson et al. | 524/147 |
| 3,676,401 | 7/1972 | Henry | 523/126 |
| 3,694,412 | 9/1972 | Nozaki | 260/63 CQ |
| 3,753,952 | 8/1973 | Guillet | 523/125 |
| 3,984,940 | 10/1976 | Reich et al. | 524/147 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |

OTHER PUBLICATIONS

Gerald Scott: *Development in Polymer Stabilization-5*, 71–83 (1982).
Anthony Davis and David Sims: *Weathering of Plastics*, 120–123 (1983).
H. Baldyga and H. C. Jones: *Rubber Chemistry and Technology*, vol. 39, No. 4, Part 1 (Sep. 1966) 1347–1357.

*Primary Examiner*—Veronica P. Hoke

[57] ABSTRACT

Linear alternating polymers of carbon monoxide and at least one ethylenically unsaturated hydrocarbon demonstrate melt stability when selected proportions of zinc oxide, zinc sulfide and a trialkylphosphite are incorporated therein.

18 Claims, No Drawings

4,960,807

STABILIZED CARBON MONOXIDE OLEFIN COPOLYMER COMPOSITIONS

FIELD OF THE INVENTION

This invention relates to stabilized compositions comprising linear alternating polymers of carbon monoxide and at least one ethylenically unsaturated hydrocarbon. More particularly, the present invention relates to compositions stabilized against loss of crystallinity by the inclusion therein of small amounts of zinc oxide, zinc sulfide and a trialkylphosphite.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical initiators, e.g., peroxy compounds. U.K. Patent specification No. 1,081,304 produces similar polymers of higher carbon monoxide content in the presence of alkylphosphine complexes of palladium salts as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent general process for the production of the linear alternating polymers is illustrated by a number of published European Patent Applications including Nos. 121,965, 181,014, 213,671 and 257,663. The process usually involves the use of a catalyst composition formed from a Group VIII metal selected from palladium, cobalt or nickel, the anion of a non-hydrohalogenic acid having a pKa below about 6, preferably below 2, and a bodentate ligand of phosphorus, arsenic or antimony.

The resulting polymers are relatively high molecular weight materials having established utility as premium thermoplastics in the production of shaped articles such as containers for food and drink by procedures which are conventionally employed with thermoplastics. Although the linear alternating polymers are crystalline with defined melting points, the polymers do tend to lose crystallinity when exposed to multiple melting/solidification cycles. This apparent loss of crystallinity results in decreases in certain of the desirable properties of the polymers. It would be of advantage to provide compositions of the linear alternating polymers which have been stabilized against such loss of crystallinity, i.e., which have a higher melt stability.

SUMMARY OF THE INVENTION

This invention provides compositions of linear alternating polymer of carbon monoxide and at least one ethylenically unsaturated hydrocarbon which are stabilized against undue loss of crystallinity upon repeated melting/crystallization cycles. More particularly, the invention provides such compositions which are stabilized against the loss of crystallinity by the inclusion therein of small amounts of zinc oxide, zinc sulfide and a trialkylphosphite.

DESCRIPTION OF THE INVENTION

The stabilized compositions of the invention comprise the linear alternating polymer of carbon monoxide and at least one ethylenically unsaturated hydrocarbon which are now known as polyketones or polyketone polymers, stabilized against undue loss of crystallization by the presence of a stabilizing quantity of a mixture of zinc oxide, zinc sulfide and a trialkylphosphite. Mixtures of these three components in polymers are known. U.S. Pat. Nos. 4,123,474 and 4,255,321 disclose such mixtures employed in polymeric mixtures of polyphenylene oxide and polystyrene, optionally in the presence of additional components, as thermal and oxidative stabilizers.

The ethylenically unsaturated hydrocarbons which are useful as precursors of the polyketone polymers have up to 20 carbon atoms inclusive, preferably up to 10 carbon atoms inclusive, and are aliphatic including ethylene and other alpha-olefins such as propylene, 1-butene, isobutylene, 1-hexene, 1-octene and 1-dodecene, or are arylaliphatic containing an aryl substituent on a carbon atom of an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. Preferred polyketone polymers are copolymers of carbon monoxide and ethylene or terpolymers of carbon monoxide, ethylene and a second hydrocarbon of at least 3 carbon atoms, particularly an alpha-olefin such as propylene.

When the preferred terpolymers of carbon monoxide, ethylene and a second hydrocarbon are employed in the compositions of the invention, there will be at least about 2 units incorporating a moiety of ethylene for each unit incorporating a moiety of the second hydrocarbon. Preferably, there will be from about 10 to about 100 units incorporating a moiety of ethylene for each unit incorporating a moiety of the second hydrocarbon. The polymeric chain of the preferred polymers is therefore represented by the repeating formula

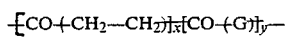

(I)

wherein G is a moiety of the second hydrocarbon polymerized through the ethylenic unsaturation. The —CO—(—CH$_2$—CH$_2$—)— units and the —CO—(—G—)— units are formed randomly throughout the polymer chain and the ratio of y:x is no more than about 0.5. In the modification of the invention where copolymers of carbon monoxide and ethylene are employed without the presence of the second hydrocarbon, the polymers are represented by the above formula (I) wherein y is 0. When y is other than 0, i.e., terpolymers are employed, ratios of y:x from about 0.01 to about 0.1 are preferred. The end groups or "caps" of the polymers will depend upon what materials are present during the preparation of the polymers and how or whether the polymers are purified. The precise nature of the end groups is of little significance so far as the overall properties of the polymer are concerned so that the polymer is fairly represented by the polymer chain as depicted above.

Of particular interest are the polymers of the above formula having a molecular weight from about 1000 to about 200,000, especially those of number average molecular weight of from about 20,000 to about 90,000 as determined by gel permeating chromatography. The precise physical properties of the polymers will depend upon the molecular weight, whether the polymer is a copolymer or a terpolymer, and in the case of terpolymers, the nature and proportion of the second hydrocarbon present. Typical melting points of the polymers are from about 175° C. to about 300° C., more often from about 210° C. to about 270° C. The polymers will have a limiting viscosity number (LVN), measured as dl/g in m-cresol at 60° C., of from about 0.5 to about 10, preferably from about 0.8 to about 4.

These polymers are produced by the general methods of the above published European Patent Applications. Although the scope of the polymerization is extensive, a preferred catalyst composition is formed from a palladium salt, particularly a palladium alkanoate such as palladium acetate, the anion of trifluoroacetic acid or p-toluenesulfonic acid, and a bidentate ligand of phosphorous such as 1,3-bis(diphenylphosphino)propane or 1,3-bis[di(2-methoxyphenyl)phosphino]propane. The reactants are typically contacted in the presence of the catalyst composition under polymerization conditions in an inert reaction diluent. Suitable reaction diluents include lower alkanols such as methanol or ethanol, lower alkyl ketones such as acetone and methyl ethyl ketone, or mixtures thereof. Typical polymerization conditions include a reaction temperature from about 20° C. to about 150° C., preferably from about 30° C. to about 135° C. The suitable reaction pressures are from about 10 bar to about 200 bar, but reaction pressures from about 20 bar to about 100 bar are preferred. Subsequent to reaction, the polymer is recovered from the polymer-containing suspension by conventional methods such as filtration or decantation.

The polyketone polymers are stabilized against loss of crystallinity during repeated melting/crystallization cycles by the inclusion therein of a stabilizing quantity of a mixture of zinc oxide, zinc sulfide and a trialkylphosphite. Trialkylphosphites wherein each alkyl independently has up to 20 carbon atoms inclusive are satisfactory and the alkyl groups are the same or are different. Suitable trialkylphosphites having alkyl groups with as few as 1 or 2 carbon atoms, e.g., trimethylphosphite or triethylphosphite, are useful although better results are obtained when each alkyl group independently has from about 6 to about 14 carbon atoms, e.g., trihexylphosphite, tridecylphosphite, dioctyldodecylphosphite, tridodecylphosphite, hexylditetradecylphosphite or tritetradecylphosphite. Best results are obtained when the trialkylphosphite is tridecylphosphite.

The role of the individual components of the three-component mixture is not completely understood but the mixture of zinc oxide, zinc sulfide and the trialkylphosphite provides more efficient stabilization of the polyketone polymer than do the individual components. The stabilizing mixture is employed in a quantity of from about 0.5% by weight to about 3% by weight, preferably from about 0.75% by weight to about 2% by weight, based on total composition. Within the mixture of the zinc oxide, zinc sulfide and trialkylphosphite, the major component is zinc oxide which is present in a quantity of at least about 60% by weight, based on the total mixture, preferably in a quantity of at least about 80% by weight on the same basis. The zinc sulfide and trialkylphosphite are individually employed in quantities up to about 30% by weight based on the total three part mixture, preferably up to about 10% by weight on the same basis, provided, of course, that the total proportions of zinc oxide, zinc sulfide and trialkylphosphite equal 100%. In a preferred modification, the zinc sulfide and the trialkylphosphite are present in approximately equal proportions and each is present in a range of from about 7.5% by weight, based on total three component mixture, up to about 10% by weight on the same basis.

The compositions of the invention are intimate mixtures of the polyketone polymer and the zinc oxide/zinc sulfide/trialkylphosphite stabilizer mixture. The method of producing the intimate mixture is not critical and conventional methods of producing an intimate mixture of a thermoplastic polymer and a stabilizer are suitably employed. In one modification, the components in finely divided form are mixed and the resulting mixture is passed through an extruder to form the mixture as an extrudate. In an alternate modification the composition is produced in a mixing device such as a mixer or a blender operating at high shear. The polymer and the components of the stabilizer are preferably mixed in a single operation although satisfactory results are obtained if the components of the zinc oxide/zinc sulfide/trialkylphosphite stabilizer are added separately. The stabilized compositions may contain other additives such as colorants, plasticizers, fibers, reinforcements and dyes which are added to the polymer together with or separately from the stabilizer.

The resulting compositions will have an improved melt stability as evidenced by a relatively constant apparent crystallinity when subjected to processing operations of melting and crystallization. This improvement in retained apparent crystallinity offers considerable advantages which are not to be found when unstabilized polymers are utilized. For example, in a typical processing scheme, the stabilized composition is converted into nibs by passage through an extruder. The nibs are then injection molded to produce a shaped article, in each case without substantial decrease in crystallinity as determined by a relatively constant melting point or other retained physical property. The compositions are particularly useful in this and other applications which require a series of melting and solidification cycles. While the compositions of the invention are also usefully processed by conventional techniques which do not involve melting or solidification of the polymer, the advantages of the stabilized compositions are most apparent when melt processing operations which do involve the melting and solidification of the polymer are employed. Thus, the compositions of the invention are useful for a variety of applications as premium thermoplastics as is now known in the art. The compositions are particularly useful for the production of shaped articles typically requiring a number of melt-solidification cycles in their production. Illustrative of such articles are containers for food and drink and parts and housings for automotive applications.

The invention is further illustrated by the following Illustrative Embodiments which should not be construed as limiting the invention.

ILLUSTRATIVE EMBODIMENT I

A terpolymer (87/009) of carbon monoxide, ethylene and propylene was produced in the presence of a catalyst composition formed from palladium acetate, trifluoroacetic acid and 1,3-bis[di(phenyl)phosphino]-propane. This polymer had a melting point of 218° C. and an LVN, measured in m-cresol at 60° C., of 2.10 dl/g.

ILLUSTRATIVE EMBODIMENT II

In this Illustrative Embodiment, measurements of melting points and crystallization (solidification) temperatures, or alternatively heats of melting and heats of fusion, were made by the use of a Perkins-Elmer differential scanning calorimeter (DSC) which employs samples of polymer or polymer composition in sealed pan containers. The pan and contents are heated at a controlled rate, typically 20° C./minute, until reaching the temperature at which the sample has melted, $T_m1$. The pan and contents were then cooled to the temperature at which the sample has solidified, $T_c1$, and then heated past a second melting point, $T_m2$, to 285° C. at which temperature the sample is maintained for 10 minutes. The pan and contents are then cooled until the sample has solidified a second time, $T_c2$. The melting point and the crystallization temperature are defined as the temperatures at which the heat flow reaches a maximum (for melting) or a minimum (for crystallization). Typically, the melting point $T_m$ will be higher than the crystallization temperature $T_c$ and each will decrease somewhat on repeated melting-solidification cycles. Although a number of factors influence the melting point and the crystallization temperatures, these values are also influenced by the crystallinity of the polymer. In general, the smaller the difference between the first and second melting points, or the first and second crystallization temperatures, the greater the degree of retained crystallinity.

It is also possible through the use of a DSC to determine the magnitude of the first and second heats of melting ($H_1$ and $H_2$) in cal/g and the first and second heats of crystallization ($C_1$ and $C_2$), also in cal/g, for the unstabilized polymer and for stabilized compositions. In general, the heats of crystallization will be higher for stabilized compositions than for the unstabilized polymer. The higher the ratio of $C_2/C_1$ is, the greater the degree of retained crystallinity.

Compositions of the terpolymer of Illustrative Embodiment I containing various proportions of zinc oxide, zinc sulfide and tridecylphosphite were produced by passing mixtures of the various components through a 15 mm twin screw Baker Perkins extruder operating at 240° C. at 300 rpm under a nitrogen blanket. The nibs obtained as an extrudate were subjected to a DSC analysis as described above. The results are shown in Table I wherein the proportions are given in percent by weight, based on total composition.

TABLE I

| Sample No. | Polymer | ZnS | ZnO | TDP | $T_2C$ | $C_2/C_1$ |
|---|---|---|---|---|---|---|
| 1 | 100 | 0 | 0 | 0 | 168 | 0.91 |
| 2 | 98 | 1 | 1 | 0 | 162 | 0.77 |
| 3 | 97 | 1 | 1 | 1 | 129 | 0.56 |
| 4 | 97.9 | 0.1 | 1 | 1 | 144 | 0.61 |
| 5 | 99.7 | 0.1 | 0.1 | 0.1 | 151 | 0.75 |
| 6 | 98.8 | 0.1 | 1 | 0.1 | 167 | 0.86 |

ILLUSTRATIVE EMBODIMENT III

By a procedure similar to that employed in Illustrative Embodiment I, a second terpolymer (87/032) was produced. This polymer had a melting point of 220° C. and an LVN, measured in m-cresol at 60° C. of 1.96 dl/g. Samples of this polymer and various proportions of ZnO, ZnS and tridecylphosphite were produced and subjected to DSC analysis by the procedure of Illustrative Embodiment II. The results are shown in Table II, wherein proportions are given in percent by weight, based on total composition.

TABLE II

| Sample No. | Polymer | ZnS | ZnO | TDP | $T_2C$ | $C_2/C_1$ |
|---|---|---|---|---|---|---|
| 1 | 100 | 0 | 0 | 0 | 157 | 0.76 |
| 2 | 99 | 0 | 1 | 0 | 141 | 0.63 |
| 3 | 98.8 | 0.1 | 1 | 0.1 | 166 | 0.87 |

What is claimed is:

1. A composition stabilized against undue loss of crystallinity when subjected to melting and solidification which comprises:

a linear alternating polymer of carbon monoxide and at least one ethylenically unsaturated hydrocarbon, wherein the polymer is represented by the repeating formula

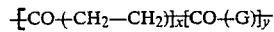

wherein G is the moiety of an ethylenically unsaturated hydrocarbon of at least 3 carbon atoms polymerized through the ethylenic unsaturation and the ratio of y:x is no more than about 0.5; and a stabilizing quantity of a mixture of zinc oxide, zinc sulfide and a trialkylphosphite.

2. The composition of claim 1 wherein the stabilizing quantity is from about 0.5% by weight to about 3% by weight, based on total composition.

3. The composition of claim 2 wherein each alkyl of the trialkylphosphite has up to 20 carbon atoms.

4. The composition of claim 3 wherein each alkyl of the trialkylphosphite has from about 6 to about 14 carbon atoms.

5. The composition of claim 4 wherein y is 0.

6. The composition of claim 4 wherein the ratio of y:x is from about 0.01 to about 0.1.

7. The composition of claim 6 wherein, in the mixture, the quantity of zinc oxide is at least about 60% by weight, based on total mixture, and the zinc sulfide and trialkylphosphite are each present in a quantity of up to 30% by weight, based on total mixture.

8. The composition of claim 7 wherein G is a moiety of propylene.

9. The composition of claim 8 wherein the zinc sulfide and tridecylphosphite are present in an amount from about 7.5% by weight to about 10% by weight, based on total mixture.

10. A method of stabilizing a linear alternating polymer of carbon monoxide and at least one ethylenically unsaturated hydrocarbon against undue loss of crystallinity during melting/solidification cycles by incorporating therein a stabilizing quantity of a mixture of zinc oxide, zinc sulfide and trialkylphosphite, wherein the polymer is represented by the repeating formula

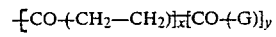

wherein G is a moiety of an ethylenically unsaturated hydrocarbon of at least 3 carbon atoms polymerized through the ethylenic unsaturation and the ratio of y:x is no more than about 0.5.

11. The method of claim 10 wherein the stabilizing quantity is from about 0.5% by weight to about 3% by weight, based on total composition.

12. The method of claim 11 wherein each alkyl of the trialkylphosphite has up to 20 carbon atoms.

13. The method of claim 12 wherein each alkyl of the trialkylphosphite has from about 6 to about 14 carbon atoms.

14. The method of claim 13 wherein y is 0.

15. The method of claim 13 wherein the ratio of y:x is from about 0.01 to about 0.1.

16. The method of claim 15 wherein, in the mixture, the quantity of zinc oxide is at least about 60% by weight, based on total mixture, and the zinc sulfide and the trialkylphosphite are each present in a quantity of up to 30% by weight, based on total mixture.

17. The method of claim 16 wherein G is a moiety of propylene.

18. The method of claim 17 wherein the zinc sulfide and tridecylphosphite are present in an amount from about 7.5% by weight to about 10% by weight, based on total mixture.

* * * * *